3,536,377
OPTICAL FORM IDENTIFYING SYSTEM

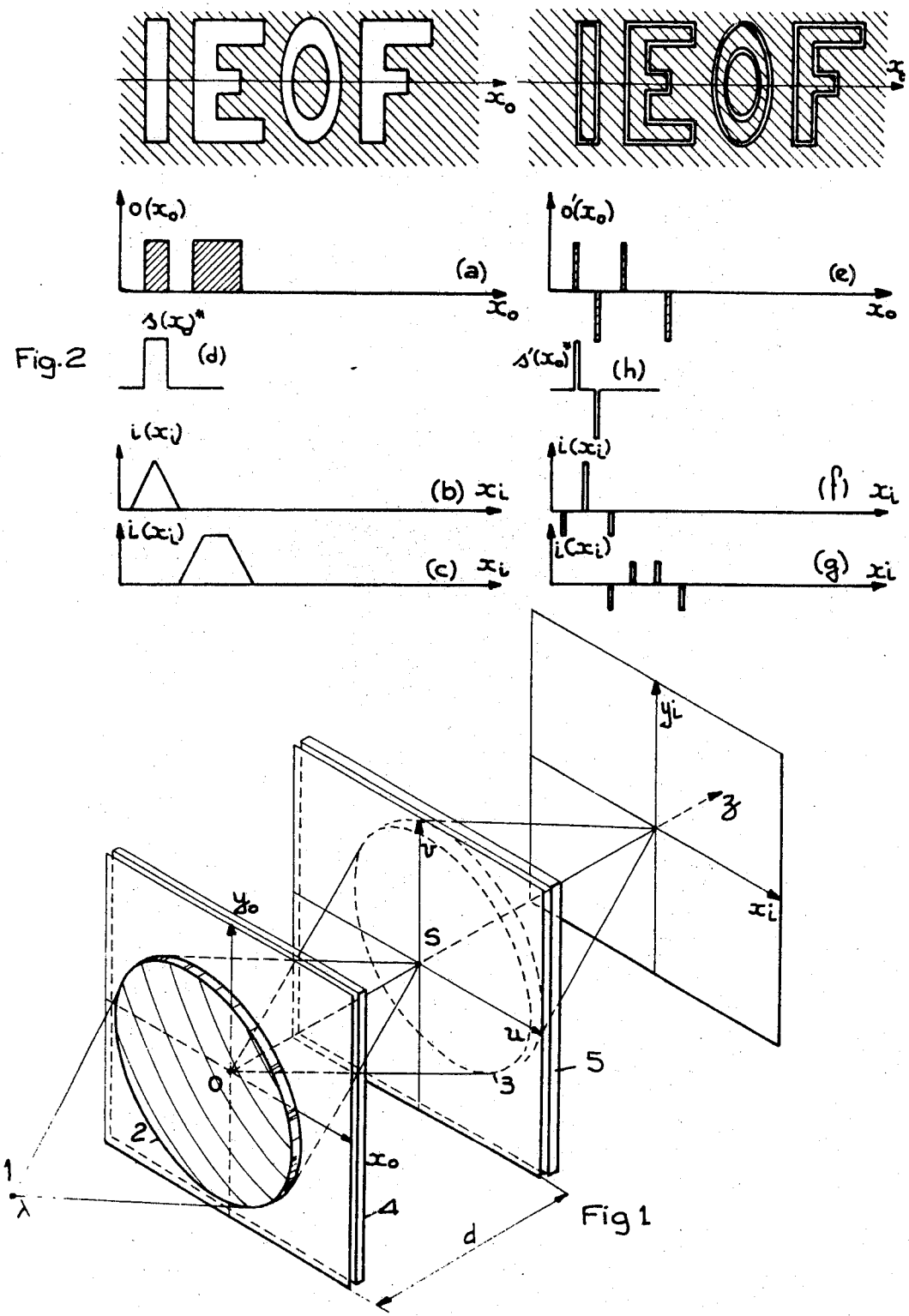

Serge Lowenthal, Paris, France, assignor to CSF-Compagnie Generale de Telegraphie Sans Fil, a corporation of France
Filed Jan. 24, 1967, Ser. No. 611,367
Claims priority, application France, Jan. 24, 1966, 46,990
Int. Cl. G02b 27/38
U.S. Cl. 350—162                                        4 Claims

ABSTRACT OF THE DISCLOSURE

A system for improving the spatial filtering of predetermined forms while rejecting other forms comprised in an image. It comprises a double diffraction optical device and a non-uniform transparency filter for performing a differentiation in the image plan by a weighting procedure applied to the diffracted luminous field.

---

The present invention realtes to double diffraction optical systems which make possible, by means of a suitable filter, the spatial filtering of light amplitude distributions with one or two variables in order to select a predetermined information. These system are employed for identifying forms or signals and more particularly for detecting and locating certain characters or words which form a text. The selection between several forms present in an image requires the use of a peaking filter whose variable transparency is connected with the nature of the optical signals between which the selection is made.

In principle, it is sufficient to provide signals which are sufficiently different for the synthesis of the filter not to involve excessive difficulties. However, in practice, matters are different, where a discrimination is to be made between forms associated with other forms which may be ill defined or even unknown, or where there are common morphological elements in the forms to be separated; in this case, the filter provided will have a response which favours certain signals which should be normally rejected.

In order to overcome this drawback, it is possible to provide a preliminary treatment of the signals to be analyzed in order to facilitate their discrimination from one another. It is also possible to proceed by cross-checking after the filtering in order to eliminate spurious responses. However, also these solutions have their inherent drawbacks.

According to the invention there is provided a double diffraction optical system for identifying a predetermined form on a composite object capable of supplying a two dimensional luminous amplitude distribution, said system comprising: first image forming means having an aperture for receiving said object, an object surface and an image surface; second image forming means having an aperture lying in said image surface, an object surface containing said first means aperture and an image surface; a monochromatic point source lying in said first means object surface for illuminating said object; spatial optical filtering means for selecting at least one elementary optical signal corresponding to said form among the optical signals supplied by said object and optical differentiating means associated with said spatial filtering means, said spatial filtering means and differentiating means positioned across said second means aperture; and means being positioned in said second means image surface for collecting a correlation signal corresponding to said form.

For a better understanding of the invention and to show how the same may be carried into effect, reference will be made to the drawing accompanying the following description and in which:

FIG. 1 shows a double diffraction optical system according to the invention; and
FIG. 2 is an explanatory drawing.

FIG. 1 shows a monochromatic point source of light 1 illuminating through a lens 2 an object plane $x_0$, $y_0$. The axes $x_0$ and $y_0$ form with an optical axis $z$ a trirectangular trihedron with the origin O. The image S of the source is formed on the axis Oz by the lens 2 in a plane $u$, $v$, perpendicular to Oz. A lens 3 forms in an image plane $y_i$, $x_i$, the image of the plane $x_0$, $y_0$. In the object plane $x_0$, $y_0$, a flat transparent object 4 is placed which modulates the convergent beam transmitted by the lens 2. Thus, the beam coming from the lens 2 transmits a complex distribution $o(x_0, y_0)$ capable of generating in the plane $u$, $v$, a diffracted field, whose amplitude is the Fourier transform of $o(x_0, y_0)$ capable of generating in the plane $u$, $v$ a diffracted field, whose amplitude is the Fourier transform of $o(x_0, y_0)$. This transform is expressed by the known relation:

$$O(u, v) = \iint_{-\infty}^{+\infty} o(x_0, y_0) e^{-\frac{2\pi j}{\lambda d}(x_0 u + y_0 v)} dx_0 dy_0 \quad (1)$$

where:

$O(u, v)$ symbolizes Fourier transform of the amplitude distruibution of the object;
$\lambda$ is the wavelength of the light;
$d$ is the distance which separates the planes $x_0$, $y_0$ and $u$, $v$.

The diffracted field $O(u, v)$ passes through the plane $u$, $v$ and through a filter 5 with non-uniform transparency disposed parallel to this plane. Through the lens 3 propagate, therefore, light amplitudes which depend on the product of the amplitudes $O(u, v)$ by the filtering law $T(u, v)$ of the filter 5. The light amplitudes distributed in the aperture of the lens 3 according to the product $O(u, v) \cdot T(u, v)$ generate in the image plane $x_i$, $y_i$ a new diffracted field which corresponds to the image $i(x_i, y_i)$ of the object $o(x_0, y_0)$. One can therefore write that:

$$I(u, v) = O(u, v) \cdot T(u, v) \quad (2)$$

where $I(u, v)$ represents the Fourier transform of $i(x_i, x_1)$.

This last mentioned relation leads to a convolution relation between the distributions of the object, $o(x_0, y_0)$, the image $i(x_i, y_i)$ and the inverse transform $t(x, y)$ of the filtering law. It follows that:

$$i(x_i, y_i) = \iint_{-\infty}^{+\infty} t(x_i - x_0, y_i - y_0) \cdot o(x_0, y_0) dx_0 dy_0 \quad (3)$$

The relations (2) and (3) show that it is possible to effect a spatial filtering by means of a double diffraction optical system which processes signals $o(x_0, y_0)$ with one or two variables in order to obtain a response $i(x_i, y_i)$ deriving from these signals by an optical filtering effected in the planes $u$, $v$. Particularly, selecting an optimum filtering law, it is possible to separated from each other the elementary signals which form part of a predetermined distribution of light amplitudes $o(x_0, y_0)$.

By way of example, if the object comprises a signal $s(x_0, y_0)$ surrounded by noise $b(x_0, y_0)$, one arrives at an amplitude distribution $o(x_0, y_0) = s(x_0, y_0) + b(x_0, y_0)$.

If the forms characterizing $s(x_0, y_0)$ and $b(x_0, y_0)$ have for respective Fourier transforms the spectra $S(u, v)$ and $B(u, v)$ which are in the plane $u$, $v$ the fields respectively diffracted by the signal $s$ and by the noise $b$, the optimum filtering law for separating the signal from the noise should be:

$$T(u, v) = \frac{S^*(u, v)}{|B(u, v)|^2} \quad (4)$$

where $S^*$ represents the complex conjugates of $S(u, v)$.

It follows from the realtion (4) that it is necessary to know B in order to optimalize the selective transmission of S. Since this information is not alaways available, it is necessary to regard the noise as having a uniform spectrum which does not fulfill the function.

$$\frac{1}{|B(u, v)|^2}$$

It is also necessary that the auto-correlation function contained in the Formula 3 should give a more pronounced response for the signal than for the noise.

This last condition is not always realized in practice, as will be demonstrated with reference to FIG. 2.

In FIG. 2, there is shown on the left an object formed by the plain letters IEOF which are set forth against an opaque background. Assuming that the letter I represents the signal and the other letters represent the noise, the figure shows at (a) the distribution $o(x_0)$ which represents along the axis $x_0$ the light amplitudes relating to the letters I and E; (d) shows the function $s^*(x_0)$, the Fourier transform of which constitutes the filtering law; (b) shows the response $i(x_i)$ to the letter I, obtained by autocorrelation, and considered as useful signal, whilst in (c) one obtains the response to the letter E contained in the noise to be eliminated. It may be seen from a comparison of the response that the noise remains after the filtering stronger or more perceptible than the signal, and this is a drawback.

Matters are different if one uses an object the letters of which are defined by their outlines as illustrated on the right side in FIG. 2. In this case, the response to the letter E, shown at (g), is clearly less perceptible than that produced by the letter I, represented at (f); it may be found that the signals shown in FIG. 2 at (e) are obtained by differentiation of the signals shown at (a).

According to the invention, the improvement of the signal-to-noise ratio due to the use of differentiated optical signals is realized by means of a filter which carries out a multiplication of the diffracted light amplitudes so that this operation carried out in the plane $u, v$, is equivalent to a differentiation of the optical signals in the object plane $x_0, y_0$.

The double diffraction optical system according to the invention effects the differentiation of optical signals with one or two variables by means of a filter, the filtering law of which can be expressed in the following form:

$$T(u,v) = m.S^*(u,v).(u^n + v^p)^q \quad (5)$$

where $m$ is a constant coefficient, and
$n, p$ and $q$ are whole positive numbers.

By way of non-limitative example, and adopting a filtering law such as:

$$T(u,v) = m.S^*(u,v).(u^2 + v^2)$$

one obtains as response of the double diffraction system:

$$i(x_i, y_i) = \iint_{-\infty}^{+\infty} \text{grad } [s(x_0, y_0)] \cdot \text{grad } [s^*(x_0 - x_i, y_0 - y_i)] dx_0 \cdot dy_0$$
$$+ \iint_{-\infty}^{+\infty} \text{grad } [b(x_0, y_0)] \cdot \text{grad } [s^*(x_0 - x_i, y_0 - y_i)] dx_0 \cdot dy_0$$

The first term of this sum corresponds to the response to the first derivative of the signal and the second term represents the response to the first derivative of the noise.

If only the differentiating property of the filter is to be used, it is possible to limit one's self to the filtering law $$T(u,v) = m(u^n + v^p)^q \quad (6)$$

This filtering law permits the differentiation of a function with one or two variables, representing a light amplitude distribution imposed by the object, without separation of the forms by autocorrelation.

It is obvious that the filtering law (5) may be produced by associating in the plane $u,v$ several filters, of which at least one carries out the differential law given by the Equation 6.

What is claimed is:

1. A double diffraction optical system for identifying a predetermined form in a composite object capable of supplying a two dimensional luminous amplitude distribution, said system comprising: first image forming means having an aperture for receiving said object, an object surface and an image surface; second image forming means having an aperture lying in said image surface, an object surface containing said first means aperture and an image surface; a monochromatic point source lying in said first means object surface for illuminating said object; spatial optical filtering means for selecting at least one elementary optical signal corresponding to said form among the optical signals supplied by said object and optical differentiating means associated with said spatial filtering means, said spatial filtering means and differentiating means being positioned across said second means aperture; said spatial filtering and differentiating means obeying the filtering law of the expression:

$$T(u,v) = m.S^*(u,v).(u^n + v^p)^q$$

where $m$ is a constant coefficient, and $n, p$ and $q$ are whole positive numbers, and $u,v$ being two reference axes of said first image forming means, T $(u, v)$ being the transmission coefficient and $S^*$ $(u, v)$ being the complex conjugate of the Fourier transform of a selected amplitude distribution corresponding to said form; and means positioned in said second means image surface for collecting a correlation signal corresponding to said form.

2. An optical system as claimed in claim 1 for transparent flat objects wherein said first and second image forming means have a common optical axis $z$ extending from said source; said first and second image forming means being convergent lenses whose object and image surfaces are planes perpendicular to said axis; said first lens image plane containing said two reference axes $u$ and $v$ forming with said optical axis a rectangular trihedron; said spatial filtering means comprise a non uniform transparency plate whose filtering law is given by said complex conjugate of the Fourier transform of a selected amplitude distribution corresponding to said form; and said optical differentiating means comprise at least one non uniform transparency plate whose filtering law is given by $T(u,v) = m.(u^n + v^p)^q$ where $m$ is a coefficient, and $n, p$ and $q$ are whole positive numbers.

3. An optical system as claimed in claim 2, wherein said source is a source of coherent light.

4. An optical system as claimed in claim 2, wherein said filtering law is given by $T(u,v) = m.(u^2 + v^2)$, $m$ being a constant.

References Cited

UNITED STATES PATENTS 3,090,281   5/1963   Marechal et al. ____ 350—162 X

OTHER REFERENCES

Cutrona et al.: "Filtering Operations Using Coherent Optics," Proceedings of the National Electronics Conference, vol. 15, 1959, pp. 262–271.

Wolf: Progress In Optics, vol. III, published by North-Holland Publishing Co., Amsterdam, 1964, pp. 142, 143 relied on.

JOHN K. CORBIN, Primary Examiner